United States Patent [19]
Nisley et al.

[11] 3,947,066
[45] Mar. 30, 1976

[54] ROOF SAFETY LATCH

[75] Inventors: Irvin A. Nisley, Rome City, Ind.; James R. Kuhl, Sturgis, Mich.

[73] Assignee: Bangor Punta Operations, Inc., Greenwich, Conn.

[22] Filed: Dec. 4, 1974

[21] Appl. No.: 529,668

[52] U.S. Cl. .................... 296/27; 52/66; 74/527; 296/23 R
[51] Int. Cl.² .......................................... B60P 3/34
[58] Field of Search.......... 296/23 R, 27; 242/107.6, 242/107.12; 254/144; 187/8.47, 8.49, 8.59; 74/527; 52/66, 67, 68

[56] References Cited
UNITED STATES PATENTS

| | | | |
|---|---|---|---|
| 2,546,387 | 3/1951 | Coffing | 74/527 X |
| 3,485,479 | 12/1969 | Baker | 296/27 |

*Primary Examiner*—Robert J. Spar
*Assistant Examiner*—Donald W. Underwood
*Attorney, Agent, or Firm*—Patrick J. Walsh

[57] ABSTRACT

Disclosed is a roof safety latch for use with travel trailers of the type having a top which is lifted and lowered to expand and contract the trailer between living quarters and road travel conditions, respectively. The travel trailer disclosed includes four telescoping upright posts at the corners of the trailer. The posts are extended to lift the trailer roof by operating a winch to haul in a main cable coupled to a yoke and from which yoke individual cables extend to each post. The safety latch hereof includes a rod carried by the yoke and which rod has a catch at its distal end which rides in a guideway. A keeper including an opening defined in the guideway is located such that the catch engates the keeper when the yoke has been hauled in sufficiently to fully extend the posts and raise the top. The rod is springbiased such that the catch engages the keeper as the catch traverses the guideway. A release bracket is pivotally carried by the guideway to displace the catch from engagement with the keeper when it is desired to lower the trailer top.

7 Claims, 7 Drawing Figures

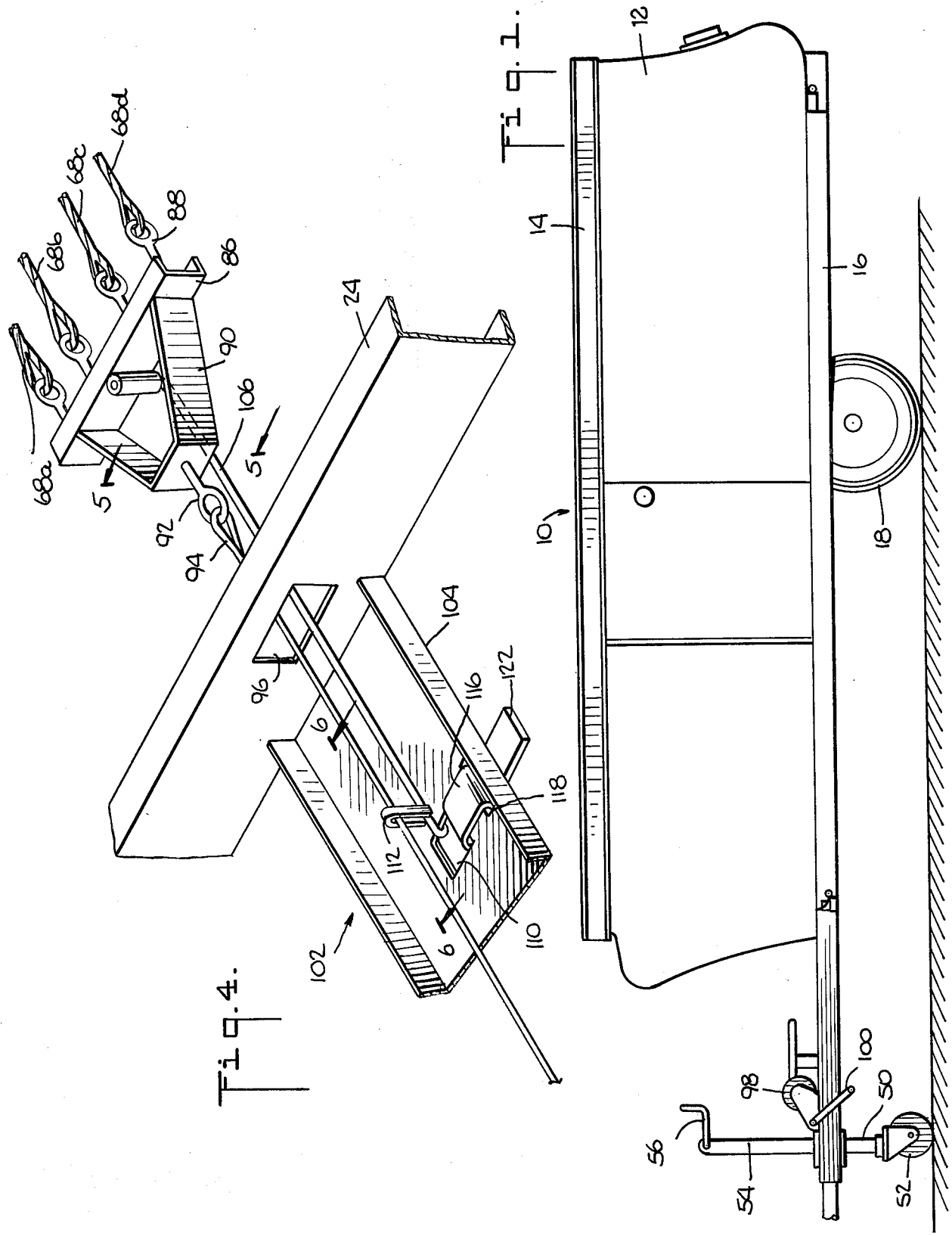

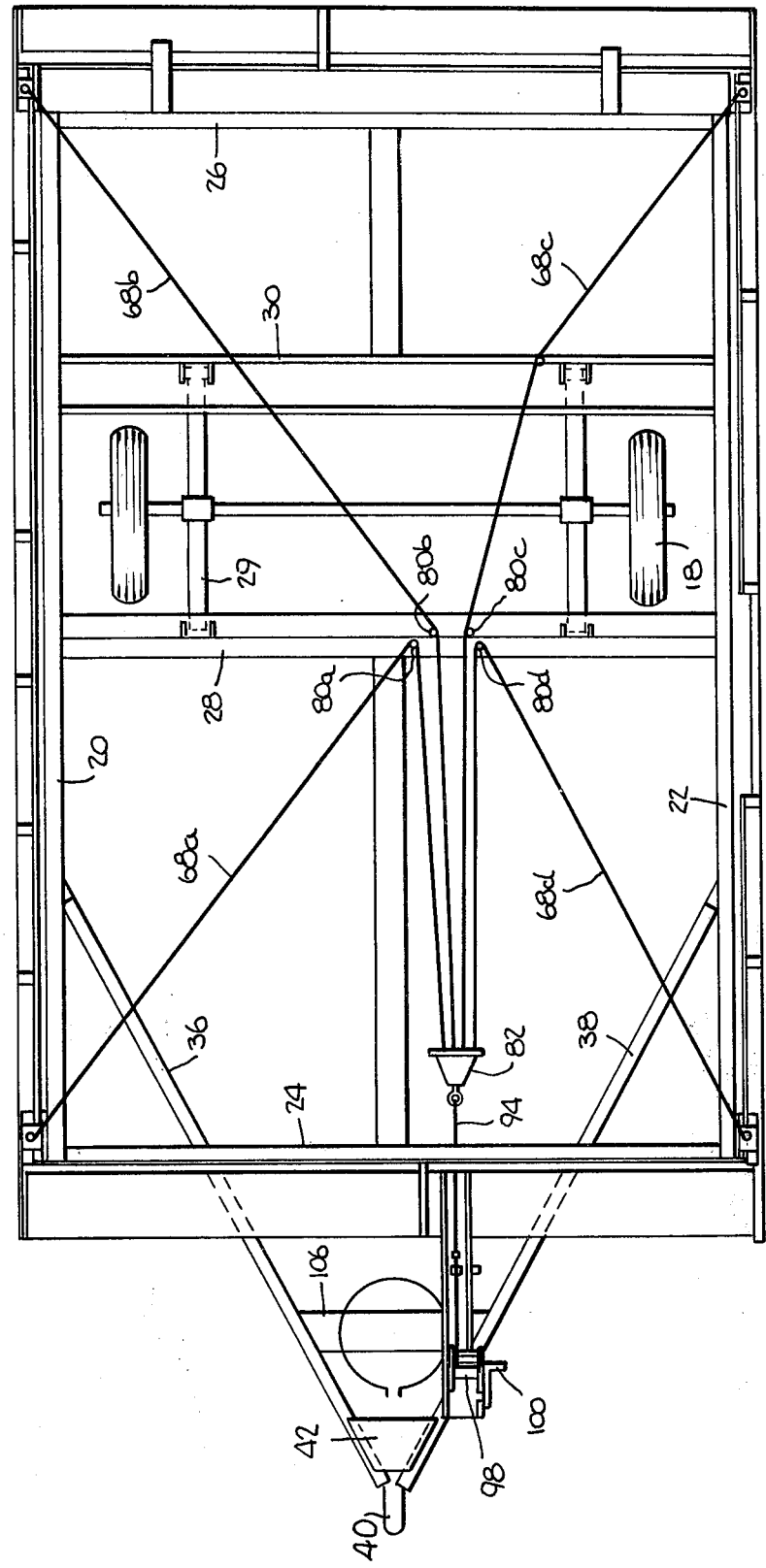

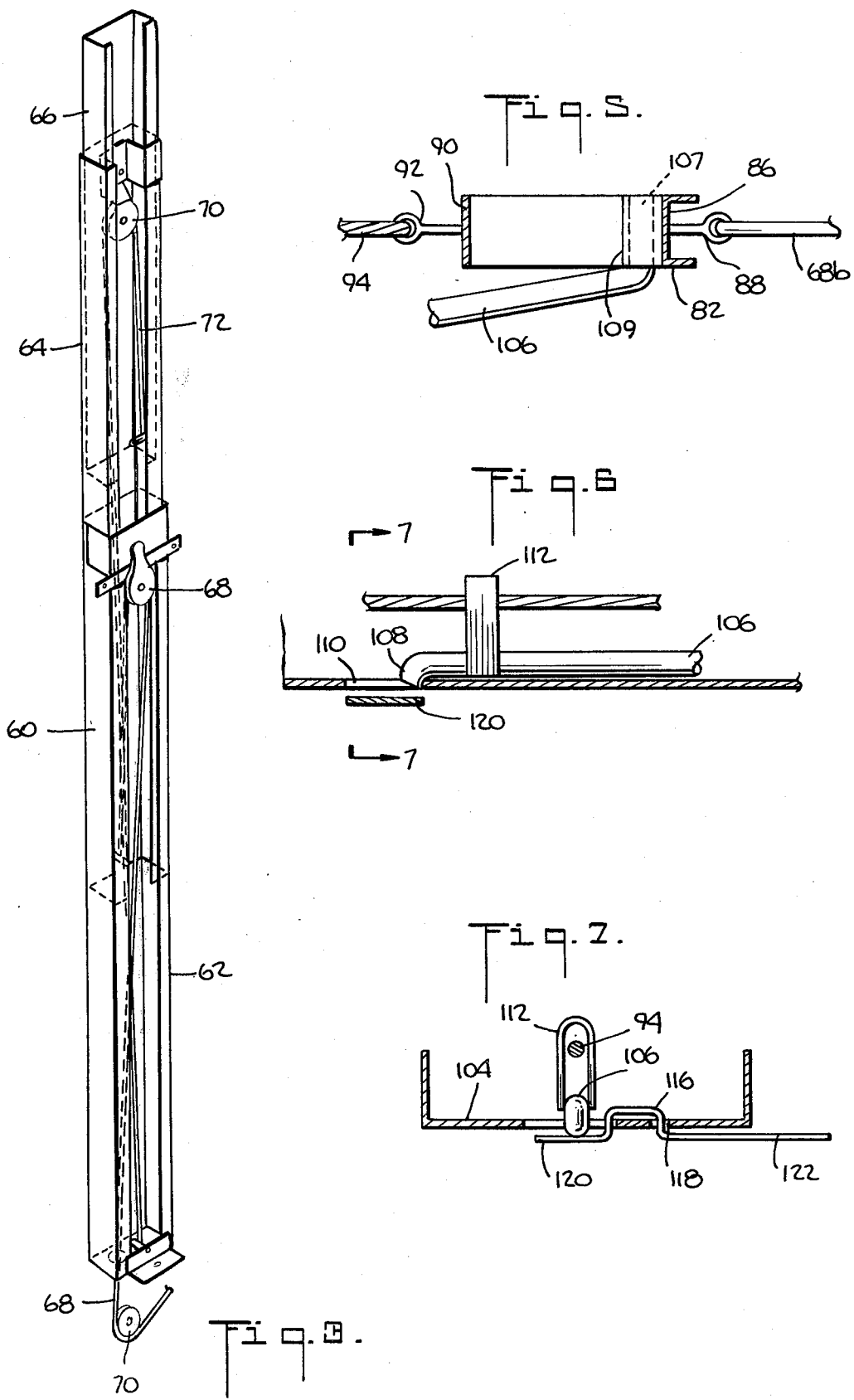

ROOF SAFETY LATCH

The present invention relates to travel trailers of the type having a top which is lifted and lowered to expand and contract the trailer to provide living quarters and road travel conditions respectively and more particularly relates to a roof safety latch for positively locking the trailer roof in its raised condition in the event of a malfunction of the standard roof raising and lowering mechanism.

In U.S. Pat. No. 3,314,715, there is disclosed a travel trailer of the type presently under consideration wherein the trailer includes a frame having telescoping corner posts, the upper ends of which carry a roof flexibly joined to the body of the frame. The posts are extended to raise the roof by operation of a winch which hauls in a main cable connected to a yoke. The yoke, in turn, carries cables individually attached to each of the four corner posts which, when the yoke is displaced forwardly by the main cable, extend the telescoping sections of the posts to raise the trailer roof to a condition providing living quarters in the trailer. In that patent disclosure, the winch is provided with a ratchet and pawl arrangement whereby the winch is retained in a locked condition when the roof has been raised. The weight of the roof and the telescoping sections of the corner posts maintain a bias, through the cables connected to the yoke and through the main cable on the winch, tending to unwind the winch and lower the trailer top. In the event that the pawl is inadvertently removed from engagement with its ratchet, or the winch malfunctions or the main cable breaks, the telescoping sections would retract and the roof would be lowered. There has thus been developed the need for a safety latch independent of the winch and main cable for preventing inadvertent or accidental lowering of the roof and injury to the occupants of the trailer incident to such accidental lowering of the roof.

Accordingly, the present invention provides a safety latch of a type which provides a positive mechanical and automatically actuated lock for retaining the trailer roof in its raised position notwithstanding malfunction of the ratchet and pawl, the winch per se or breakage of the main cable. To this end, there is provided a safety latch including a rod connected at one end to the yoke and extending forwardly through an opening in the forward cross frame member to terminate in a catch at its opposite end. The catch rides in an upwardly opening generally channel-shaped guideway for receiving the catch. The rod is spring biased to continuously bear against the guideway such that when the yoke is advanced to a position wherein the roof top is fully raised, the catch is positively displaced into the aperture and thereby set to engage the margins of the aperture to prevent movement of the yoke in an opposite direction under the rearward bias of the cables interconnecting the yoke and the telescopic posts in the event of malfunction of the winch or severance of the cable. Consequently, when the winch has drawn the yoke forwardly to a position wherein the roof is fully raised, the catch is set to engage the margins of the keeper aperture in the guideway to prevent movement of the yoke in the opposite direction under the bias afforded thereto by the weight of the roof top and telescoping posts should the conventional locking mechanism fail. This locking action is independent of the winch and main cable. Thus, the roof can be positively conventionally locked in its raised condition and failure of the winch or severance of the main cable would not result as heretofore in automatic lowering of the roof with possible injury to the occupants of the travel trailer incidental to such inadvertent lowering of the roof.

Accordingly, it is a primary object of the present invention to provide a novel and improved roof safety latch for use in a travel trailer.

It is another object of the present invention to provide a novel and improved roof safety latch which is positive acting and which is automatically set to lock the trailer roof in its raised condition in the event of failure of the conventional roof locking mechanism.

It is still another object of the present invention to provide a novel and improved roof safety latch for a travel trailer wherein injury to the occupants of the trailer is avoided in the event of failure of the winch or severance of the winch cable.

It is a further object of the present invention to provide a novel and improved safety latch for use with travel trailers which latch is set for positive locking engagement for each raising of the roof to its fully raised position and which latch is operable to lock the roof in its fully raised position independent of the winch and main cable.

It is still a further object of the present invention to provide a novel and improved roof safety latch which can be readily and easily adapted to existing travel trailers of the foregoing described type and which may be readily released from its latching position in order to lower the roof top.

These and further objects and advantages of the present invention will become more apparent upon reference to the following specification, appended claims and drawings wherein:

FIG. 1 is a side elevational view of a travel trailer incorporating a roof safety latch constructed in accordance with the present invention;

FIG. 2 is a top plan view of the frame of the trailer with the trailer body removed to illustrate the roof raising and lowering mechanism and the roof safety latch of the present invention;

FIG. 3 is a perspective view of one of the telescoping corner posts utilized to raise and lower the roof top;

FIG. 4 is a fragmentary perspective view of the roof safety latch hereof;

FIGS. 5 and 6 are fragmentary enlarged cross-sectional views taken generally about on lines 5—5 and 6—6, respectively, in FIG. 4; and FIG. 7 is a cross-sectional view thereof taken generally about on line 7—7 in FIG. 6.

Referring now to the drawings, particularly to FIG. 1, there is illustrated a travel trailer generally designated 10 having a lower body 12, a vertically extensible top 14 which rests on the upper edge of body 12 and a frame 16 to which is suitably attached a pair of wheels 18 whereby the travel trailer may be trailered behind a vehicle. The travel trailer, excluding the roof safety latch hereof described and illustrated herein, is more particularly disclosed in U.S. Pat. No. 3,314,715 issued Apr. 18, 1967, the disclosure of which patent is incorporated herein by reference thereto as though fully set forth herein. However, to provide a clear description of the roof safety latch hereof in the present application, the following is a brief and concise description of the trailer and the roof raising and lowering mechanism of the prior patent. The frame consists of two side members 20 and 22, end members 24 and 26 and cross members 28 and 30 to which the springs 29 mounting wheels 18 are secured. A tongue is provided the frame and comprises two angularly related members 36 and 38 joined at their rearward ends to the side frames 20 and 22, respectively, and connected one to the other by a hitch 40 and a cross brace 42. As will be appreciated, the forward end of the trailer when disconnected from the vehicle is supported by a lift 50 including a wheel 52, a jacking mechanism 54 and an operating handle 56.

Body 12 is rigidly mounted on frame 16 by any suitable means and it will be appreciated that various types of furnishings including cupboards, bunks, etc. may be carried within body 12 or fixed thereto. The top 14 is comprised of a generally rectangular frame supported by telescoping posts at each of the four corners of the body 12, one of the post being illustrated at 60 in FIG. 3. The top 14 is also connected to body 12 by a flexible material whereby, when the top 14 is raised by extension of the telescopic corner posts, the flexible material extends between the body 12 and top 14 to form an enclosure.

Referring to FIG. 3, each post 60 comprises a lower section 62, an intermediate section 64 telescopically received in the upper end of lower section 62 and an upper section 66 telescopically received in the upper end of intermediate section 64. The sections may be channel or rectangular shaped as shown. To extend the posts, a pulley 68 is secured to the upper end of lower section 62 and its operating cable 68 extends about a pulley 70 at the lower end of the post. The opposite end of cable 68 is secured to the bottom of intermediate section 64. By this construction, hauling in cable 68 about pulley 70 causes the intermediate section 64 to move upwardly within the relative to lower section 62. A second pully 70 is carried adjacent the upper end of intermediate section 64 and a cable 72 is anchored at one end to the base of section 62. Cable 72 is trained over pulley 70 and anchored to the lower end of section 66. Consequently, as intermediate section 64 is raised, movement of pulley 70 upwardly with intermediate section 64 causes extension of upper section 66 relative to intermediate section 64. When cable 68 is released, the weight of the roof and telescopic sections causes the sections to telescope one within the other whereby the trailer roof is lowered to its travel condition.

As best illustrated in FIG. 2, cables 68a, 68b, 68c and 68d extend within the frame and are trained about respective pulleys 80a, 80b, 80c, and 80d carried by the frame and from such pulleys extend forwardly to a yoke 82. As best illustrated in FIG. 4, yoke 82 includes a generally channel shaped member 86 having eyelets 88 secured thereto for receiving the respective ends of cables 68a–68d. A forwardly projecting bracket 90 is secured to channel shaped bracket 86 and carries an eyelet 92 for connection with a main cable 94. Main cable 94 extends through a slot 96 in the forward end frame member 24 and is wound about a winch 98 (FIGS. 1 and 2) carried by the frame, the winch having an operating handle designated 100. From the foregoing description, it will be appreciated that hauling in main cable 94 advances yoke 82 forwardly toward the forward end frame member 24. Forward displacement of yoke 82 also hauls in each of the cables 68a–68d to extend each of the telescoping sections as previously described and consequently raise the roof of the travel trailer. Once the roof is raised, a ratchet and pawl mechanism, not shown, carried by winch 98 may be engaged to retain the roof in its raised position. To lower the roof, the pawl is released from the ratchet and the weight of the roof and the telescoping sections enables the roof to move downwardly with the yoke 82 moving toward the rear of the trailer frame and the main cable 94 being payed out from the winch.

In accordance with the present invention, a roof safety latch is provided to positively and automatically lock the roof in its raised position in the event a malfunction should occur in the winch or the main cable is severed. To accomplish this, a latch constructed in accordance with the present invention and generally designated 102, is provided and comprises, as best illustrated in FIG. 4, a channel shaped guideway 104 secured at one end to end frame member 24 and which guideway extends forwardly from member 24 toward winch 98 and is connected to a cross brace 106 interconnecting tongue members 36 and 38. A latch rod 106 is upturned at one end as illustrated at 107 in FIG. 5 for reception in a pivot 109 carried by yoke 82. The opposite end of rod 106 is downturned at 108 as illustrated in FIG. 6 to form a catch. The angle between the upturned end of rod 106 and the intermediate main portion of the rod is greater than 90 degrees to provide a downward spring force whereby the forward end of the rod, particularly catch 108, bears against the upper surface of channel shaped guideway 104. Guideway 104 is provided with a keeper which includes an aperture 110 formed in channel shaped guideway 104 and into which aperture catch 108 is biased and received when the top is in its raised position. When the top is fully raised, catch 108 is located forwardly of the keeper and set to engage the rear margin of aperture 110 as illustrated in FIG. 6 in the event of failure of the winch locking mechanism or severance of cable 94. Thus catch 108 serves to lock and prevent yoke 82 from being displaced rearwardly under the bias applied thereto by the cables 68a–68d. A generally inverted U-shaped latch support 112 is secured to guideway 104 and both main cable 94 and latch rod 106 are received through guide 112.

In use, when yoke 82 is displaced forwardly by hauling in main cable 94 by operation of winch 98, catch 108 bears along the surface of guideway 104 as it advances with the yoke. When the trailer roof is fully raised by extension of the telescoping sections, the catch 108 is disposed over aperture 110 and is displaced, under the spring bias of rod 106, into aperture 110. In the event of a malfunction of the winch or individual release of the pawl of the ratchet or a severance of the cable, the yoke is displaced slightly rearwardly to engage the catch 108 against the rear margin of the aperture forming the keeper. Thus winch malfunction or severance of the cable engages catch with the keeper to prevent inadvertent lowering of the roof as previously was the case. Alternately, the catch can be engaged with the keeper upon raising the roof whereby such locking device may serve as the primary lock to maintain the roof in its fully raised condition. In this latter instance, strain on the main cable 94 and winch 98 are relieved.

To release the positive acting locking latch 102, a generally inverted U-shape release bracket 116 is provided. Particularly, and with reference to FIGS. 4 and 7, a slot 118 is provided through guideway 104 transversely adjacent the keeper aperture 110. Bracket 116 has a horizontal release flat 120 at one end extending from one of the legs of the flange at an elevation slightly below aperture 110. Another flange from U- shaped bracket 116 projects laterally outwardly from guideway 104 and serves as a release handle. With the catch 108 engaged against the margin of the keeper aperture, it will be seen that downward movement of the release handle 122 pivots flat 120 upwardly to displace catch 108 upwardly from engagement with the keeper. With the catch 108 thus released, the weight of the top and the telescopic sections (assuming also release of the winch) displaces yoke 82 rearwardly whereby the trailer roof is lowered.

From the foregoing description, it will be appreciated that the present invention provides a roof latch which automatically and positively locks the roof of a travel trailer when the roof is fully raised in the event of a malfunction of the winch particularly its ratchet and pawl mechanism, and also in the event that the main cable breaks or is severed. Moreover, the positive acting latch hereof is automatically set to lock the trailer roof in its raised position when operator cranks the winch to raise the trailer roof without manipulation of any additional part or element of the travel trailer. The roof cannot be lowered without positively disengaging the latching mechanism hereof and hence injuries previously caused by inadvertent or accidental lowering of the roof while occupants are inside the travel trailer are substantially eliminated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A travel trailer comprising a frame, a generally rectangular body on said frame, a top movable from a lowered position on said body to a raised position spaced above said body, a top raising mechanism including a telescopic post adjacent each corner of said body, a yoke carried by said trailer for movement between first and second positions, means coupling said yoke to each of said corner posts for extending said posts thereby to raise said top to said raised position in response to movement of said yoke from said first position to said second position, means for moving said yoke from said first position to said second position, said yoke moving means including a winch carried by said frame and a main cable connected between said winch and said yoke, a guideway carried by said frame, a latch for positively retaining said yoke substantially in said said position including a latching member carried by said yoke for movement therewith and having a catch, said latch member including a rod connected at one end to said yoke and carrying said catch at the opposite end, a keeper defined by an aperture in said guideway, said catch being engageable with said keeper to retain said yoke substantially in said second position and said top in its raised position, said catch being movable along said guideway in response to movement of said yoke from said first position to said second position and movable into said aperture in response to movement of said yoke into said second position, and means for releasing said catch from engagement with said keeper, said means for releasing including a bracket movable between locking and releasing positions, said bracket having an element engageable with said catch to displace said catch from engagement with said keeper and thereby release said yoke when said bracket is moved from its locking position to its release position.

2. A travel trailer according to claim 1, wherein said rod is configured such that said catch is biased for reception in said aperture and in engagement with said keeper.

3. A travel trailer according to claim 1 wherein said rod is configured such that said catch is biased for sliding engagement along said guideway as said yoke moves from said first position to said second position.

4. A travel trailer according to claim 1 including means for guiding said rod along said guideway as said rod is moved with said yoke such that said catch is received within said aperture when said yoke moves into its second position.

5. A travel trailer comprising a frame, a generally rectangular body on said frame, a top movable from a lowered position on said body to a raised position spaced above said body, a top raising mechanism including a telescopic post adjacent each corner of said body, a yoke carried by said trailer for movement between first and second positions, means coupling said yoke to each of said corner posts for extending said posts to thereby raise said top to said raised position in response to movement of said yoke from said first position to said second position, means for moving said yoke from said first position to said second position, said yoke moving means including a winch carried by said frame and a main cable connected between said winch and said yoke, a guideway carried by said frame, a latch for positively retaining said yoke substantially in said second position including a latching member carried by said yoke for movement therewith and having a catch, said latch member being connected at one end to said yoke and carrying said catch at the opposite end, a keeper carried by said frame, said catch being engageable with said keeper to retain said yoke substantially in said second position and said top in its raised position, said catch being movable along said guideway in response to movement of said yoke from said first position to said second position and movable into engagement with said keeper in response to movement of said yoke into said second position, and means for releasing said catch from engagement with said keeper, said means for releasing including a bracket movable between locking and releasing positions, said bracket having an element engageable with said catch to displace said catch from engagement with said keeper and thereby release said yoke when said bracket is moved from its locking position to its release position.

6. A travel trailer according to claim 5 wherein said latch member is configured such that said catch is biased into latching engagement with said keeper.

7. A travel trailer according to claim 1 which further includes means carried by said winch for locking said yoke in said second position.

* * * * *